(12) United States Patent
Burton et al.

(10) Patent No.: US 9,244,801 B2
(45) Date of Patent: Jan. 26, 2016

(54) INCREASING THE ACCURACY OF SERVICE QUALITY MANAGEMENT METRICS

(71) Applicant: International Business Machines Corporation, Armonk, NY (US)

(72) Inventors: Peter H. Burton, Vancouver (CA); Manvendra Gupta, Brampton (CA); Helena Litani, Vaughan (CA); Diaa ElDin M. Y. A. Nasr, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/230,124

(22) Filed: Mar. 31, 2014

(65) Prior Publication Data
US 2015/0278062 A1 Oct. 1, 2015

(51) Int. Cl.
*G06F 3/00* (2006.01)
*G06F 11/30* (2006.01)

(52) U.S. Cl.
CPC ...... *G06F 11/3051* (2013.01); *G06F 2201/875* (2013.01)

(58) Field of Classification Search
CPC .................. G06F 11/3051; G06F 2201/875
See application file for complete search history.

(56) References Cited

U.S. PATENT DOCUMENTS

| | | | | |
|---|---|---|---|---|
| 2008/0082524 | A1* | 4/2008 | Inaba et al. | 707/5 |
| 2010/0082379 | A1* | 4/2010 | Chan et al. | 705/7 |
| 2010/0161290 | A1* | 6/2010 | Duchenay et al. | 703/2 |
| 2011/0231470 | A1 | 9/2011 | Thompson et al. | |
| 2011/0301737 | A1* | 12/2011 | Chen | 700/104 |
| 2012/0039460 | A1* | 2/2012 | Krishnapuram et al. | 379/265.07 |
| 2012/0254053 | A1* | 10/2012 | Joa et al. | 705/319 |
| 2013/0097198 | A1 | 4/2013 | Goteti et al. | |
| 2013/0198319 | A1* | 8/2013 | Shen et al. | 709/217 |

OTHER PUBLICATIONS

Fluss, Donna, "Contact Center Manager's KPI Survival Guide", DMG Consulting LLC, Jun. 2006, <www.dmgconsult.com>.

* cited by examiner

*Primary Examiner* — Henry Tsai
*Assistant Examiner* — Jing-Yih Shyu
(74) *Attorney, Agent, or Firm* — Trentice V. Bolar

(57) ABSTRACT

According to embodiments of the present invention, one or more computer processors determine a source for a performance indicator of a target service element is known. The one or more computer processors select, at run time, a source for the performance indicator that has a least amount of information gaps. The one or more computer processors determine information associated with the performance indicator from the source. The one or more computer processors determine whether the determined information associated with the performance indicator is more current than a quality indicator periodicity value that is associated with the target service element. In response to determining that the determined information associated with the performance indicator is more current than a quality indicator periodicity value that is associated with the target service element, the one or more computer processors selecting the performance indicator.

6 Claims, 4 Drawing Sheets

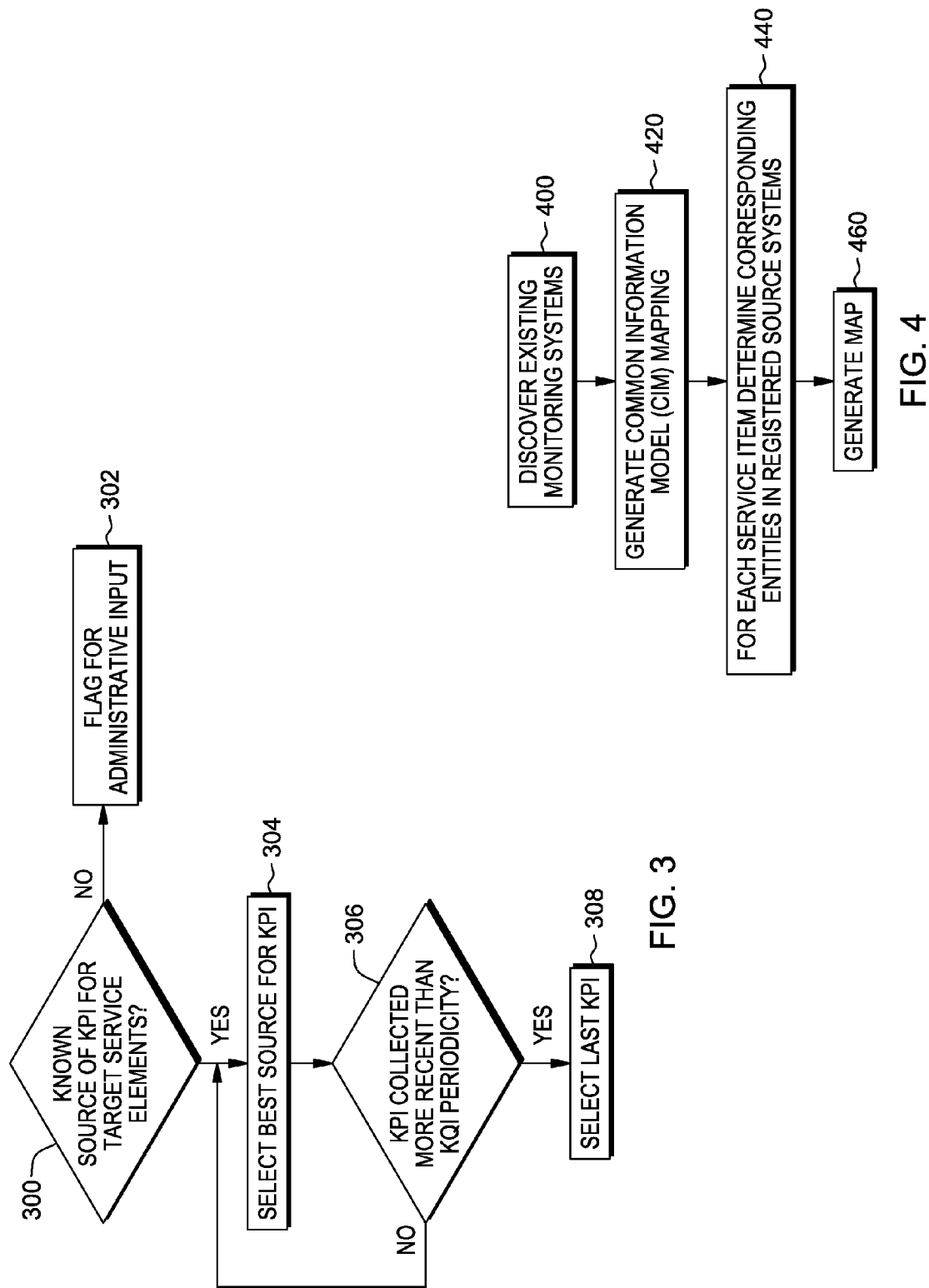

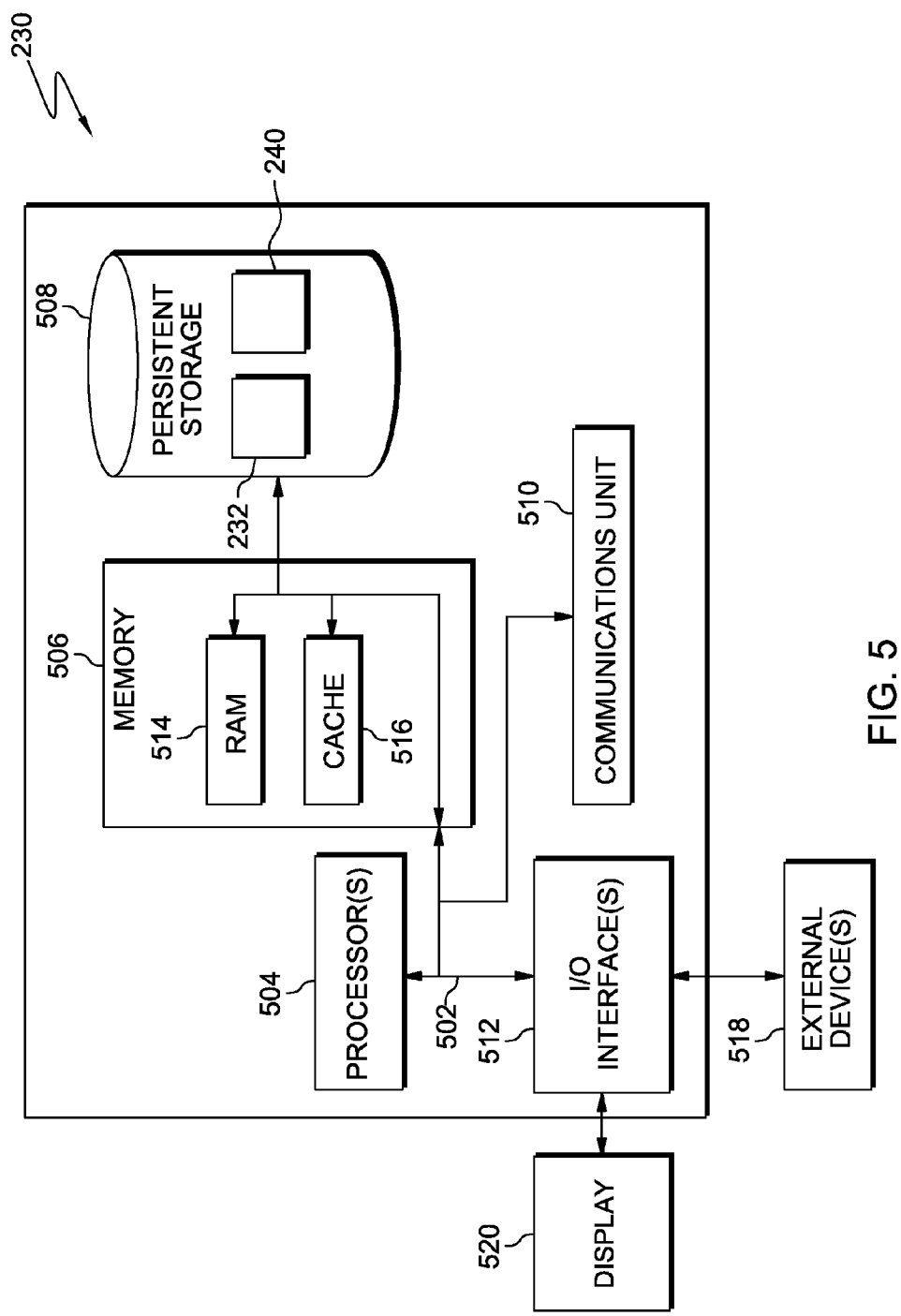

INCREASING THE ACCURACY OF SERVICE QUALITY MANAGEMENT METRICS

BACKGROUND

The present disclosure relates to the field of service quality management, and more particularly to increasing the accuracy of service quality management metrics. Deployment of data services require an industrializing of the carrier's data program and having user experience influence network operations. Service quality management ("SQM") entails the monitoring and maintenance of end-to-end services for specific customers or classes of customers. Service quality is the collective effect of service performances which determine the degree of satisfaction of a user of the service. A service is a means of delivering value to customers by facilitating outcomes customers/end-users want to achieve but without the ownership of specific costs and risks. SQM allows one to ascertain how a service is performing and how that service is experienced by the user.

FIG. 1 depicts a typical environment for SQM that comprises data sources, a server, and one or more clients. The server has a key quality indicator ("KQI") combination layer and a service level agreement ("SLA") layer. The KQI combination layer is where the KQIs are created and the SLA layer is where the SLA is modeled. The service quality data store is where the computed KQIs and received key performance indicators ("KPIs") are further stored for reporting. Here, granular metrics ("data sources") are collected for each of the service components that are then used to make a higher-level metric.

The mapping of higher-level metrics to granular metrics is hard-coded; hence, when downstream components are not functioning properly there are gaps in the service quality measurement. Monitoring business services requires the collection of different metrics from a variety of monitoring systems, such as network topology, fault, performance, configuration, and more. Typically, each set of metrics are defined and collected by separate and often isolated, assurance systems. The metrics collected by each assurance system are pre-defined at deployment time.

The metric data is aggregated to determine the overall health of a business service, according to pre-defined service key performance indicators ("KPIs"), which is a type of performance measurement that measure a specific aspect of the performance of either a service resource or a group of service resources of the same type. KPIs are typically restricted to a specific resource type and derived from network measurements. If an assurance system that is providing metrics to the business service management ("BSM") system in not functioning, there is a gap in metrics obtained, and therefore the business service is deemed to be compromised or degraded.

The current nature of business service management is pre-defined and static, relying on pre-defined metrics being collected by various assurance and resource monitoring systems. If an assurance system is unavailable, this often results in a window of missing data over a period of time, leading to the business service being depicted as in poor health or degraded according to it's KPIs. Current solutions today utilize "self-mirroring" or manage-our-stuff-with-our-stuff, which sends a synthetic alert when one of the monitoring systems that generate service quality data is down. Upon receiving such an alert, the operations staff may take corrective action; however, the service assurance data will still be missing for the time period of the outage.

SUMMARY

According to embodiments of the present invention, one or more computer processors determine a source for a performance indicator of a target service element is known. The one or more computer processors select, at run time, a source for the performance indicator that has a least amount of information gaps. The one or more computer processors determine information associated with the performance indicator from the source. The one or more computer processors determine whether the determined information associated with the performance indicator is more current than a quality indicator periodicity value that is associated with the target service element. In response to determining that the determined information associated with the performance indicator is more current than a quality indicator periodicity value that is associated with the target service element, the one or more computer processors select the performance indicator.

BRIEF DESCRIPTION OF THE SEVERAL VIEWS OF THE DRAWINGS

FIG. 3 is a flowchart depicting the operational steps of a program function, in accordance with an embodiment of the present invention.

FIG. 4 illustrates additional operational steps of the program function, in accordance with an embodiment of the present invention.

FIG. 5 depicts a block diagram of components of the monitoring server, in accordance with an embodiment of the present invention.

DETAILED DESCRIPTION

Figure 1:
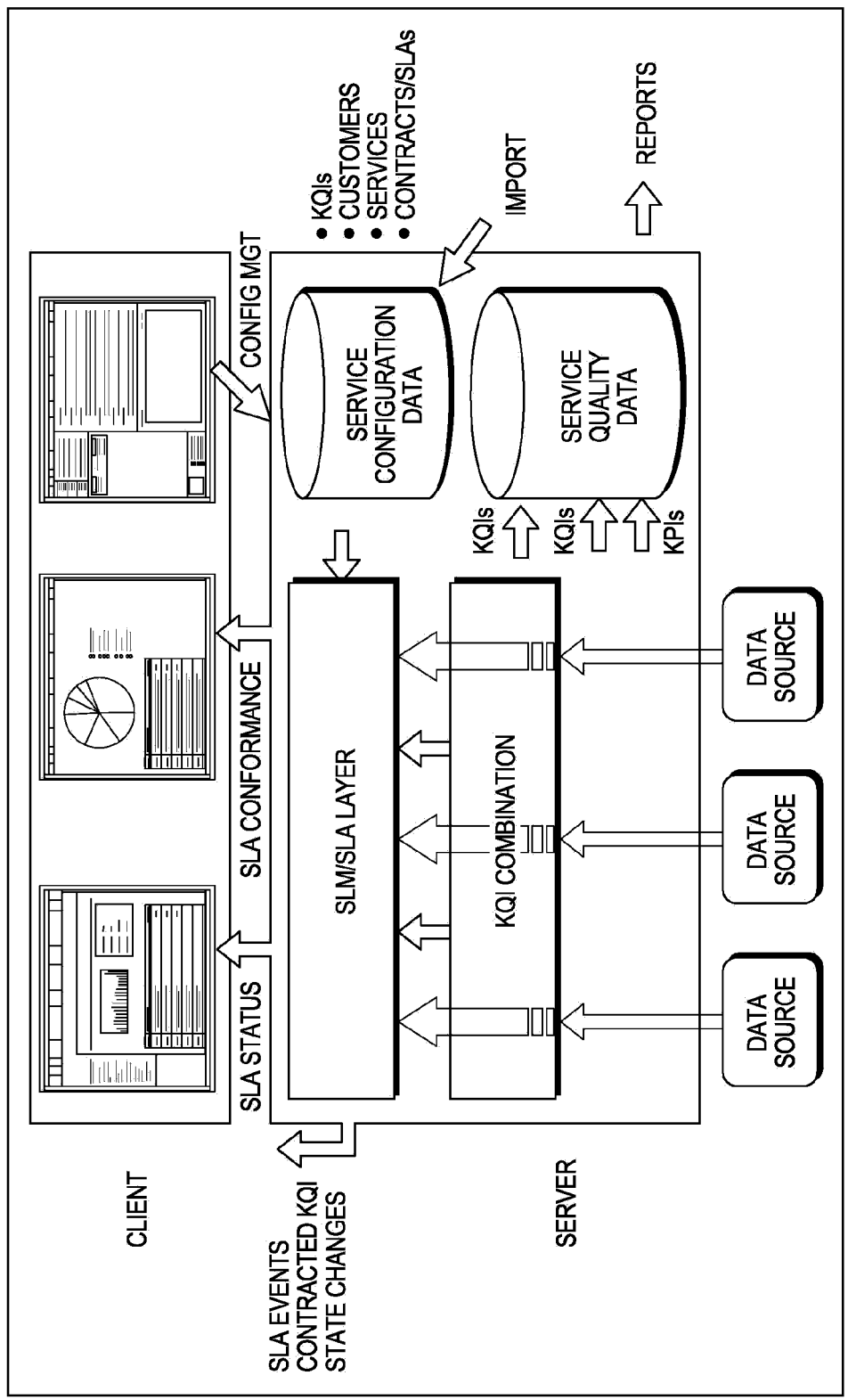
FIG. 1 depicts a typical service quality management ecosystem.

With reference now to FIGS. 1-5.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Deployment of data services require an industrializing of the carrier's data program and having user experience influence network operations. Service quality management ("SQM") entails the monitoring and maintenance of end-to-end services for specific customers or classes of customers. Service quality is the collective effect of service performances which determine the degree of satisfaction of a user of the service. A service is a means of delivering value to customers by facilitating outcomes customers/end-users want to achieve but without the ownership of specific costs and risks. SQM allows one to ascertain how a service is performing and how that service is experienced by the user.

In SQM, granular metrics are collected for each of the service components that are then used to make a higher-level metric. The mapping of higher-level metrics to granular metrics is hard-coded; hence, when downstream components are not functioning properly there are gaps in the service quality measurement. Monitoring business services requires the collection of different metrics from a variety of monitoring systems, such as network topology, fault, performance, configuration, and more. Typically, each set of metrics are defined and collected by separate and often isolated, assurance systems. The metrics collected by each assurance system are pre-defined at deployment time.

The metric data is aggregated to determine the overall health of a business service, according to pre-defined service key performance indicators ("KPIs"), which is a type of performance measurement that measure a specific aspect of the performance of either a service resource or a group of service resources of the same type. KPIs are typically restricted to a specific resource type and derived from network measurements. If an assurance system that is providing metrics to the business service management ("BSM") system in not functioning, there is a gap in metrics obtained, and therefore the business service is deemed to be compromised or degraded.

Embodiments of the present invention seek to provide a mechanism for coupling granular metrics with service-level metrics, such that the source of the service-level metric is determined at runtime. Here, the coupling is based on various sources, such as, the best data source based upon the service level agreement ("SLA"); and business service components that are monitored by the monitoring system; attributes of the metrics collected by the monitoring systems.

Figure 2:
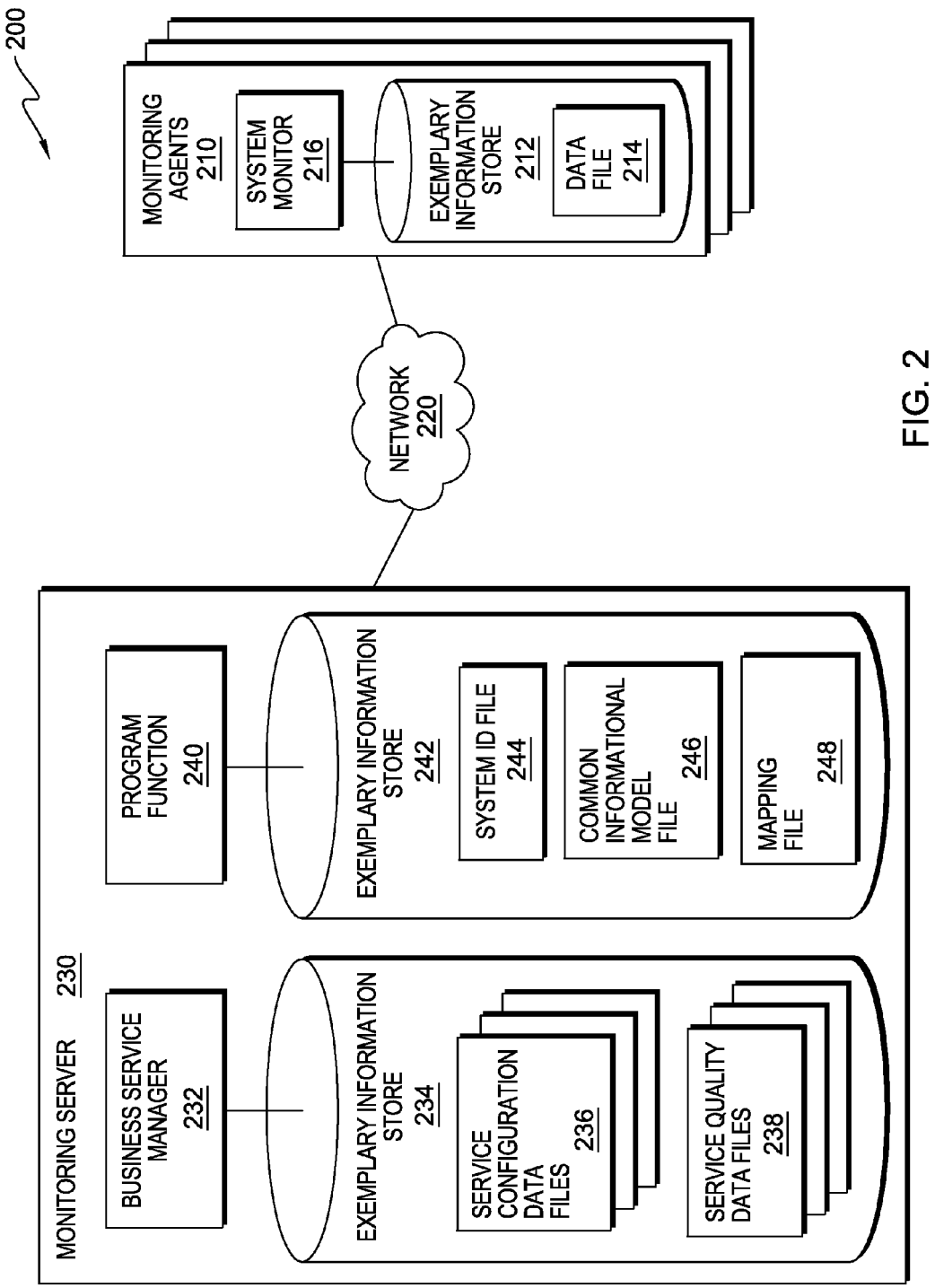
FIG. 2 is a block diagram illustrating an environment, in accordance with an embodiment of the present invention.

Embodiments of the present invention will now be described in detail with reference to the Figures. FIG. 2 is a block diagram illustrating an environment, generally designated 200, in accordance with one embodiment of the present invention.

Environment 200 includes monitoring agents 210 and monitoring server 230, all interconnected over network 220. Network 220 can be, for example, a local area network (LAN), a wide area network (WAN) such as the Internet, or a combination of the two, and can include wired, wireless, or fiber optic connections. In general, network 220 can be any combination of connections and protocols that will support communications between monitoring agents 210 and monitoring server 230.

In various embodiments of the present invention, monitoring agents 210 and monitoring server 230 may be a laptop computer, a tablet computer, a netbook computer, a personal computer (PC), a desktop computer, a personal digital assistant (PDA), a smart phone, or any programmable electronic device capable of communicating via network 220. Monitoring agents 210 are computing devices that monitor a particular aspect of a service, such as fault, configuration, accounting, and performance, in accordance with an embodiment of the present invention. Monitoring agents 210 include exemplary information store 212, which is in communication with system monitor 216. Exemplary information store 212 is an information store that includes data file 214, which includes monitoring data generated by system monitor 216. System monitor 216 is software that monitors system and network applications of network 220 and measures the availability and performance thereof (not shown). System monitor 216 can generate KPIs for the particular service it is monitoring.

Monitoring server 230 is a computing device that facilitates the management of business services, in accordance with an embodiment of the present invention. Monitoring server 230 includes exemplary information store 234, business service manager 232, exemplary information store 242, and program function 240. Exemplary information store 234 is in communication with business service manager 232. Exemplary information store 234 is an information repository that includes service quality data files 238 and service configuration data files 236. Service quality data files 238 are files that include KPIs generated by monitoring agents 210 and received via network 220.

Service configuration data files 236 are files that include modeled service level agreements and similar artifacts, such as customer, service, and contract related information. Business service manager 232 is in communication with exemplary information store 234 and program function 240. Business service manager 232 is software that measures, monitors, and/or models one or more specifics services for the purpose of improving the understanding of the user experience, in accordance with an embodiment of the present invention. Business service manager 232 can receive, via network 220, metrics generated by monitoring agents 210.

Business service manager 232 can receive, via network 220, KPIs generated by monitoring agents 210. Business service manager 232 can generate reports associated with the performance of services monitored by monitoring agents 210 by using generated KQIs. Business service manager 232 can generate KQIs by combining KPIs according to a predefined KQI computation cycle. Business service manager 232 can generate KQIs according to a predetermined periodicity. Business service manager 232 can model service level agreements. Business service manager 232 can display the SLA for a service. Business service manager 232 can generate and/or display information associated with the conformance of a service for a particular KQI.

Exemplary information store 242 is in communication with program function 240. Exemplary information store 242 is an information repository that includes mapping file 248, common information model ("CIM") file 246, and system id file 244. Mapping file 248 is a data structure that associates system entities, KPIs, and KPI monitoring frequency. A system entity is a person or object for which information is stored. Examples of system entities include, but are not limited to, policy, workflow, account, and service. CIM file 246 includes information that reflects how managed objects in environment 200 are represented as a common set of objects and relationships between them.

In an embodiment, information included in CIM file 246 conforms to the standards defined by the Distributed Management Task Force or Web-Based Enterprise Management. System identification file 244 includes information reflective of the registered monitoring systems associated with network 220, such as monitoring agents 210. Program function 240 is in communication with business service manager 232 and exemplary information store 242, in accordance with an embodiment of the present invention. Program function 240 is software that increases the accuracy of service quality metrics, such as KQIs, in accordance with an embodiment of the present invention.

Program function 240 can transmit instructions to business service manager 232. Program function 240 can generate mapping file 248. Program function 240 can generate CIM file 246. Program function 240 can generate system identification file 244. Program function 240 can determine whether a source for a KPI for a target service element is known. Program function 240 can determine the best source for a KPI. In an embodiment, the best source for a KPI is the source that has the least amount of information gaps as determined by a predetermined periodicity. In other embodiments, information gaps measurements are determined using a predetermined threshold value reflective of an associated information quantity minimum.

FIG. 3 is a flowchart depicting operational steps of program function 240, in accordance with an embodiment of the present invention. The operational steps depicted in FIG. 3 execute subsequent to business service manager 232 configuring the service KPIs. Program function 240 determines whether the source for each KPI for the target system elements is known (decisional 300). A method for discovering is discussed further below in reference to FIG. 4. For example, program function 240 determines if the desired KPI source for a given interface of the target system (not separately shown in the drawings) for a given router of the target system (not separately shown in the drawings) is included in mapping file 248. If program function 240 determines that the source for KPIs for the target system elements are not known ("no" branch, decisional 300), then program function 240 flags that KPI for administrative input (step 302). If program function 240 determines that the source for KPIs for the target system elements are known ("yes" branch, decisional 300), then program function 240 selects the best source for the KPI (step 304). For example, the best KPI source may be determined based upon the associated SLA.

Program function 240 determines whether the KPI was collected more recently than the KQI periodicity (decisional 306). For example, the agent that is included in monitoring agents 210 that generates KPIs for a given interface of the target system may have a periodicity of 2 minutes. If program function 240 determines that the KPI was not collected more recently than the KQI periodicity ("no" branch, decisional 306), then program function 240 returns to step 304. If program function 240 determines that the KPI was collected more recently than the KQI periodicity ("yes" branch, decisional 306), then program function selects the last collected KPI and transmits it to business service manager 232 for feeding the KQI at the next computation cycle (step 308). For example, if the KPI was collected in less than 2 minutes then that particular KPI is utilized at the next computation cycle.

FIG. 4 depicts additional operational steps of program function 240, in accordance with an embodiment of the present invention. Specifically, FIG. 4 depicts the operational steps utilized by program function 240 for discovering and registering existing monitoring systems, which provide the known KPI sources required for the determination of decisional 300 (discussed above). Program function 240 discovers existing monitoring systems associated with environment 200 (step 400). Program function 240 generates a common information model ("CIM") mapping (step 420). For example, one interface for a router may be identified as "If<12>" in one target system and "IF_IP_12" on another target system. The CIM is one applicable mechanism to correlate disparate events. If no such mechanism is available, a predetermined look up file may be used. For each service item, program function 240 determines the corresponding entities in the registered source systems (step 440). Program function 240 generates a map (step 460). For example, program function 240 generates a hash map that associates entities, KPIs, and/or frequencies, which facilitate the identification of entities across monitoring systems. In an embodiment, the map may be a lookup file or hash table.

FIG. 5 depicts a block diagram of components of monitoring server 230, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

A non-transitory computer readable storage medium embodiment herein is readable by a computerized device. The non-transitory computer readable storage medium stores instructions executable by the computerized device to perform a method that tests integrated circuit devices to measure a voltage overshoot condition.

Monitoring server 230 includes communications fabric 502, which provides communications between computer processor(s) 504, memory 506, persistent storage 508, communications unit 510, and input/output ("I/O") interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory ("RAM") 514 and cache memory 516. In general, memory 506 can include any suitable volatile or non-volatile computer readable storage media.

Business service manager 232 and program function 240 are stored in persistent storage 508 for execution by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory ("ROM"), an erasable programmable read-only memory ("EPROM"), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of monitoring agents 210. In these examples, communications unit 510 includes one or more network interface cards. Communications unit 510 may provide communications through the use of either or both physical and wireless communications links. Business service manager 232 and program function 240 may be downloaded to persistent storage 508 through communications unit 510.

I/O interface(s) 512 allows for input and output of data with other devices that may be connected to monitoring server 230. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., business service manager 232 and program function 240, can be stored on such portable computer readable storage media and can be loaded onto persistent storage 508 via I/O interface(s) 512. I/O interface(s) 512 also connects to a display 520. Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

What is claimed is:

1. A method comprising:
   determining, by one or more computer processors, a source for a performance indicator of a target service element is known;
   selecting, by one or more computer processors, at run time, a source for the performance indicator that has a least amount of information gaps;
   determining, by one or more computer processors, information associated with the performance indicator from the source;
   determining, by one or more computer processors, whether the determined information associated with the performance indicator is more current than a quality indicator periodicity value that is associated with the target service element; and in response to determining that the determined information associated with the performance indicator is more current than a quality indicator periodicity value that is associated with the target service element, selecting, by one or more computer processors, the performance indicator;

wherein the step of determining, by the one or more computer processors, the source for the performance indicator of a target service element is known comprises the steps of:

discovering an existing monitoring system, generating a common information map having a plurality of service items associated therewith, for each service item included in the plurality of service items, determining a corresponding entity in a registered source system, and generating a map.

2. The method of claim 1, wherein the generated map is a hash map that associates the corresponding entity with at least one of the performance indicator and a periodicity value.

3. A computer program product comprising:

a non-transitory computer readable storage medium having stored thereon:

first computer instructions executable by a device to cause the device to determine a source for a performance indicator of a target service element is known;

second computer instructions executable by the device to cause the device to select a source for the performance indicator that has a least amount of information gaps;

third computer instructions executable by the device to cause the device to determine information associated with the performance indicator from the source;

fourth computer instructions executable by the device to cause the device to determine whether the determined information associated with the performance indicator is more current than a quality indicator periodicity value that is associated with the target service element; and in response to determining that the determined information associated with the performance indicator is more current than a quality indicator periodicity value that is associated with the target service element, fifth computer instructions executable by the device to cause the device to select the performance indicator;

wherein the first program instructions to determine the source for the performance indicator of a target service element is known comprise:

sixth program instructions to discover an existing monitoring system, seventh program instructions to generate a common information map having a plurality of service items associated therewith, for each service item associated with the common information map, eighth program instructions to determine a corresponding entity in a registered source system, and ninth program instructions to generate a map.

4. The computer program product of claim 3, wherein the common information map is a hash map that associates the corresponding entity with at least one of the performance indicator and a periodicity value.

5. A computer system comprising:

one or more computer processors;

one or more non-transitory computer readable tangible storage media;

program instructions stored on the one or more computer readable tangible storage media for execution by at least one of the one or more computer processors, the program instructions comprising program instructions to:

determine a source for a performance indicator of a target service element is known;

select, at run time, a source for the performance indicator that has a least amount of information gaps;

determine information associated with the performance indicator from the source;

determine whether the determined information associated with the performance indicator is more current than a quality indicator periodicity value that is associated with the target service element; and in response to determining that the determined information associated with the performance indicator is more current than a quality indicator periodicity value that is associated with the target service element, selecting the performance indicator;

wherein the program instructions to determine the source for the performance indicator of a target service element is known comprise program instructions to:

discover an existing monitoring system, generate a common information map, for each service item associated with the common information map having a plurality of service items associated therewith, determine a corresponding entity in a registered source system, and generate a map.

6. The computer system claim 5, wherein the common information map is a hash map that associates the corresponding entity with at least one of the performance indicator and a periodicity value.

* * * * *